(12) United States Patent
Murakami et al.

(10) Patent No.: US 11,505,317 B2
(45) Date of Patent: Nov. 22, 2022

(54) FLYING OBJECT

(71) Applicant: HONDA MOTOR CO., LTD., Tokyo (JP)

(72) Inventors: Hideo Murakami, Wako (JP); Yoshitaka Minagawa, Wako (JP); Koji Muraoka, Wako (JP); Ayatoshi Yokokawa, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 159 days.

(21) Appl. No.: 16/970,412

(22) PCT Filed: Feb. 7, 2019

(86) PCT No.: PCT/JP2019/004347
§ 371 (c)(1),
(2) Date: Aug. 17, 2020

(87) PCT Pub. No.: WO2019/163524
PCT Pub. Date: Aug. 29, 2019

(65) Prior Publication Data
US 2021/0114728 A1    Apr. 22, 2021

(30) Foreign Application Priority Data

Feb. 23, 2018    (JP) .............................. JP2018-030795

(51) Int. Cl.
*G05D 1/08*        (2006.01)
*B64C 39/02*       (2006.01)
*B64C 17/04*       (2006.01)

(52) U.S. Cl.
CPC ............ *B64C 39/024* (2013.01); *B64C 17/04* (2013.01); *G05D 1/0816* (2013.01); *B64C 2201/027* (2013.01)

(58) Field of Classification Search
CPC . B64C 39/024; B64C 17/04; B64C 2201/027; B64C 17/02; G05D 1/0816; B64F 5/60; B25J 13/00
See application file for complete search history.

(56) References Cited

U.S. PATENT DOCUMENTS

| 9,550,561 | B1 | 1/2017 | Beckman et al. |
| 2008/0133069 | A1* | 6/2008 | Morales De La Rica ................... G05D 1/106 244/175 |
| 2018/0141647 | A1 | 5/2018 | Suzuki |

FOREIGN PATENT DOCUMENTS

| CN | 203318676 | 12/2013 |
| JP | 2006142884 A * | 6/2006 |

(Continued)

OTHER PUBLICATIONS

Extended European Search Report for European Patent Application No. 19757843.8 dated Mar. 18, 2021.

(Continued)

*Primary Examiner* — Sze-Hon Kong
*Assistant Examiner* — Ana D Thomas
(74) *Attorney, Agent, or Firm* — Amin, Turocy & Watson, LLP

(57) ABSTRACT

A flying object (drone) has a propeller drive unit provided in a fuselage thereof, and flies through the air by being driven by the propeller drive unit. The drone has a gravitational center movement device which is provided in the upper section of the fuselage and is capable of moving the total gravitational center position of the entire drone. The drone is equipped with a movement controller which moves the total gravitational center position to a target position by acquiring the total gravitational center position and controlling operation of the gravitational center movement device.

20 Claims, 7 Drawing Sheets

(56) References Cited

FOREIGN PATENT DOCUMENTS

| JP | 2006-193027 | 7/2006 |
| JP | 2007-261414 | 10/2007 |
| JP | 2009-005874 | 1/2009 |
| JP | 2016-068692 | 5/2016 |
| WO | 2016/185572 | 11/2016 |
| WO | 2017/159038 | 9/2017 |

OTHER PUBLICATIONS

International Search Report and Written Opinion for International Application No. PCT/JP2019/004347 dated Mar. 12, 2019, 8 pages.

* cited by examiner

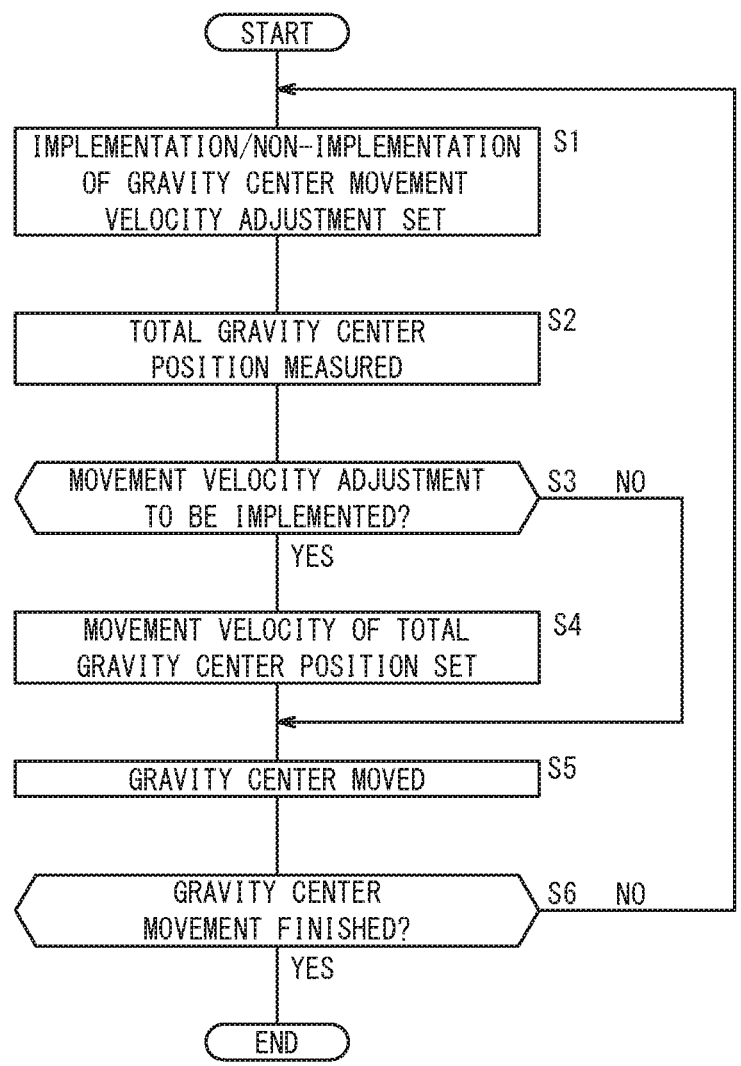

FLYING OBJECT

TECHNICAL FIELD

The present invention relates to a flying body (object) that flies through the air.

BACKGROUND ART

Japanese Laid-Open Patent Publication No. 2016-068692 and International Publication WO 2016/185572 disclose flying bodies that each include a plurality of propeller driving sections in a machine body and flies through the air by obtaining lift through the rotation of propellers. Furthermore, these flying bodies are each configured to fly stably by suitably controlling the posture thereof during flight when affected by disturbances such as wind, by having a weighted portion connected below the machine body in a displaceable manner.

SUMMARY OF INVENTION

A flying body flies in various environments, and when flying bodies are being developed, there is a desire for implementing flight testing that simulates flight environments that are close to reality. However, when various flight environments are prepared to test a flying body, the development cost is significantly increased.

Furthermore, in the recent development of flying bodies, testing such as loading heavy objects onto flying bodies or having people board flying bodies is being performed, and in such cases, it is important to inspect the flight status of the flying body when the gravity center position moves during flight.

The present invention has been made in view of the above circumstance, and has the objective of providing a flying body that simulate flight environments closer to reality and enable favorable flight testing or the like, by making it possible to arbitrarily move the gravity center position thereof with a simple configuration.

In order to achieve this objective, the present invention is a flying body that includes a lift generation apparatus in a machine body and is capable of flying through air due to driving of the lift generation apparatus, the flying body comprising a gravity center movement apparatus that is provided in a top portion or a bottom portion of the machine body and is configured to move a total gravity center position of the overall flying body; and a movement control section configured to move the total gravity center position to a target position, by acquiring the total gravity center position and controlling operation of the gravity center movement apparatus.

In this case, the movement control section should be configured to arrange the total gravity center position at a center position of the flying body in an initial state, by controlling the operation of the gravity center movement apparatus.

Furthermore, the movement control section preferably sets a movement range of the total gravity center position to be within an outermost contour of the flying body, in a planar view.

Yet further, the lift generation apparatus may be provided in plurality to the machine body, and the movement control section may set a movement range of the total gravity center position to be within virtual lines connecting centers of the plurality of lift generation apparatuses, in a planar view.

The lift generation apparatus may be provided in plurality to the machine body, and the movement control section may set a movement range of the total gravity center position to be within virtual lines connecting proximity points that are located in the plurality of lift generation apparatuses and closest to a center position of the flying body, in a planar view.

The movement control section can be configured to adjust movement velocity of the total gravity center position in a manner to decrease as the total gravity center position becomes farther from a center position of the flying body.

The movement control section can be configured to adjust movement velocity of the total gravity center position in a manner to increase as the total gravity center position becomes closer to a center position of the flying body.

Alternatively, the lift generation apparatus may be provided in plurality to the machine body, the movement control section may set a movement limit of the total gravity center position to be an outermost contour of the flying body in a planar view, and set first virtual lines connecting centers of the plurality of lift generating apparatuses, and second virtual lines connecting proximity points that are located in the plurality of lift generation apparatuses and closest to a center position of the flying body, in the planar view, and in a case where movement velocity of the total gravity center position in a first region between the movement limit and the first virtual lines is a first velocity V1, the movement velocity of the total gravity center position in a second region between the first virtual lines and the second virtual lines is a second velocity V2, and the movement velocity of the total gravity center position in a third region inside the second virtual lines is a third velocity V3, the movement control section may adjust the movement velocity such that V1<V2<V3 is established.

In addition to the above configuration, the movement control section may be configured to switch whether or not adjustment of the movement velocity is implemented.

Here, the gravity center movement apparatus is preferably a slide mechanism configured to move a weight along a rail provided to the machine body.

Alternatively, the gravity center movement apparatus may be a robot arm that includes a plurality of arms provided to the machine body, and a joint portion configured to pivotably connect one arm to another arm, the robot arm being configured to move a weight fixed to the arms.

According to the present invention, the flying body can allow a user to check the change in posture of the flying body that accompanies the gravity center movement of the gravity center movement apparatus, with a simple configuration that includes the gravity center movement apparatus and the movement control section. Specifically, during flight of the flying body, the movement control section checks where the gravity center of the overall flying body is and moves the total gravity center position to the target position by controlling the operation of the gravity center movement apparatus. In this way, it is possible to easily simulate the change in the gravity center occurring when a disturbance is received in a realistic flight environment. Accordingly, by using this flying body, it is possible to favorably implement various types of flight testing.

Furthermore, in a case where the gravity center movement apparatus is provided in the top portion of the machine body, it is possible to reproduce a boarding type of flying body onto which a person can board, as the flying body planned for development. In other words, even though a person does not actually board the flying body, it is possible to simulate a flight state of the flying body equivalent to a state in which a person has boarded (posture change caused by weight movement or the like). Alternatively, if the gravity center movement apparatus is provided in the bottom portion of the machine body, it is possible to reproduce a loading type of flying body onto which heavy objects (baggage) are loaded, as the flying body planned for development. In other words, even though heavy objects are not actually loaded onto the flying body, it is possible to simulate a flight state of the flying body equivalent to a state in which heavy objects have been loaded (gravity center position change caused by baggage movement or the like).

BRIEF DESCRIPTION OF DRAWINGS

FIG. 5 is a flow chart showing a process flow of the movement controller during gravity center movement;

DESCRIPTION OF EMBODIMENTS

The following describes in detail examples of preferred embodiments of the present invention, while referencing the accompanying drawings.

First Embodiment

Figure 1:
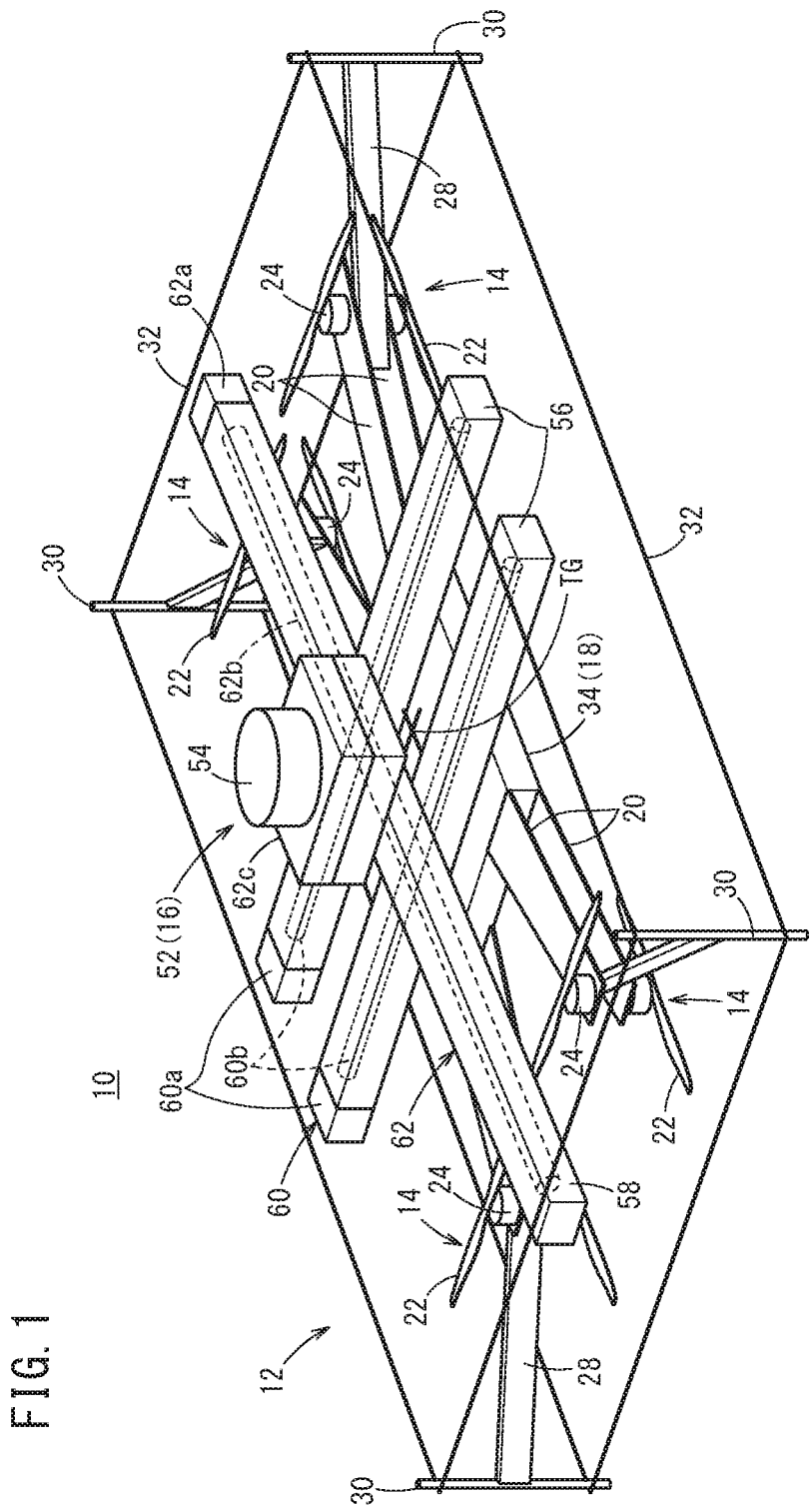
FIG. 1 is a perspective view showing an overall configuration of a flying body according to a first embodiment of the present invention.

As shown in FIG. 1, a flying body 10 (also referred to below as a drone 10) according to the first embodiment of the present invention includes, in a machine body 12, a plurality of propeller driving sections 14 that are lift generation apparatuses, and obtains lift to fly through the air by rotationally driving each propeller driving section 14 individually. The drone 10 can be configured as a boarding type capable of having a person boarded thereon or a loading type capable of having heavy objects loaded thereon.

During development or the like, this drone 10 can be used for a test of checking the effects occurring when the machine body 12 receives a disturbance. Specifically, the drone 10 includes a gravity center movement apparatus 16 in the machine body 12, and the gravity center position of the overall drone 10 (referred to below as the total gravity center position TG) is moved arbitrarily by a user. In this way, in the test of the drone 10, change in the total gravity center position TG occurring when the drone 10 receives a disturbance can be favorably reproduced, and the behavior of the drone 10 at this time (change of the posture and position, return of the posture, and the like) can be checked. The total gravity center position TG is a position of the center of gravity obtained by adding together the machine body 12 and the loaded objects (the gravity center movement apparatus 16 and a weight 54) in the machine body 12, and also includes other loaded objects if such objects are included in the drone 10.

Specifically, the drone 10 according to the present embodiment is formed with the machine body 12 having an overall rectangular shape. For the sake of convenience in the following description, one end side of the drone 10 in the longitudinal direction is referred to as a front end, and the other end side in the longitudinal direction is referred to as a rear end. It is obvious that the drone 10 can fly in various directions (ascending direction, descending direction, front direction, rear direction, and both side directions) in a three-dimensional space, by being driven by the propeller driving sections 14.

The machine body 12 includes a main body 18, a plurality of extension frames 20 that extend from side surfaces of the main body 18, and the propeller driving sections 14 provided to the plurality of extension frames 20. In the present embodiment, a total of eight extension frames 20 are provided, protruding as a top and bottom pair from each of the four corners of the box-shaped main body 18. The pairs of top and bottom extension frames 20 are supported in a fixed manner by a support frame (not shown in the drawings) provided therebetween.

One propeller driving section 14 is provided to each extension frame 20, for a total of eight propeller driving sections 14. The number and arrangement of the propeller driving sections 14 provided to the drone 10 are not particularly limited, and as an example, a configuration may be used in which only the top-side extension frames 20 among the eight extension frames 20 are each provided with one propeller driving section 14 (total of four propeller driving sections 14).

The top and bottom propeller driving sections 14 provided to the pairs of top and bottom extension frames 20 protrude in a direction away from each other, from non-opposing surfaces of the extension frames 20. Each propeller driving section 14 includes a propeller 22, a motor 24 that rotates the propeller 22, and an ESC 26 (see FIG. 2) that controls driving of the motor 24.

The propeller 22 is formed with a long and thin plate shape extending linearly, and the center position thereof in the longitudinal direction is fixed to a shaft portion (not shown in the drawings) of the motor 24. The plurality of propellers 22 each rotate integrally with the rotation of the shaft portion to form a rotational surface 22a (see FIG. 3) having a diameter that is the total length of the propeller 22. In other words, the rotational surface 22a forms a portion of the propeller driving section 14. Each rotational surface 22a faces in the same direction (an up-down direction parallel to the planar direction of the extension frames 20).

The shaft portion, which is a rotor, of the motor 24 protrudes in a direction orthogonal to the extension direction of the extension frame 20, and the shaft portion is held in a rotatable manner by a stator (not shown in the drawings). The type of motor 24 is not particularly limited, and a brushed DC motor can be used, for example.

Figure 2:
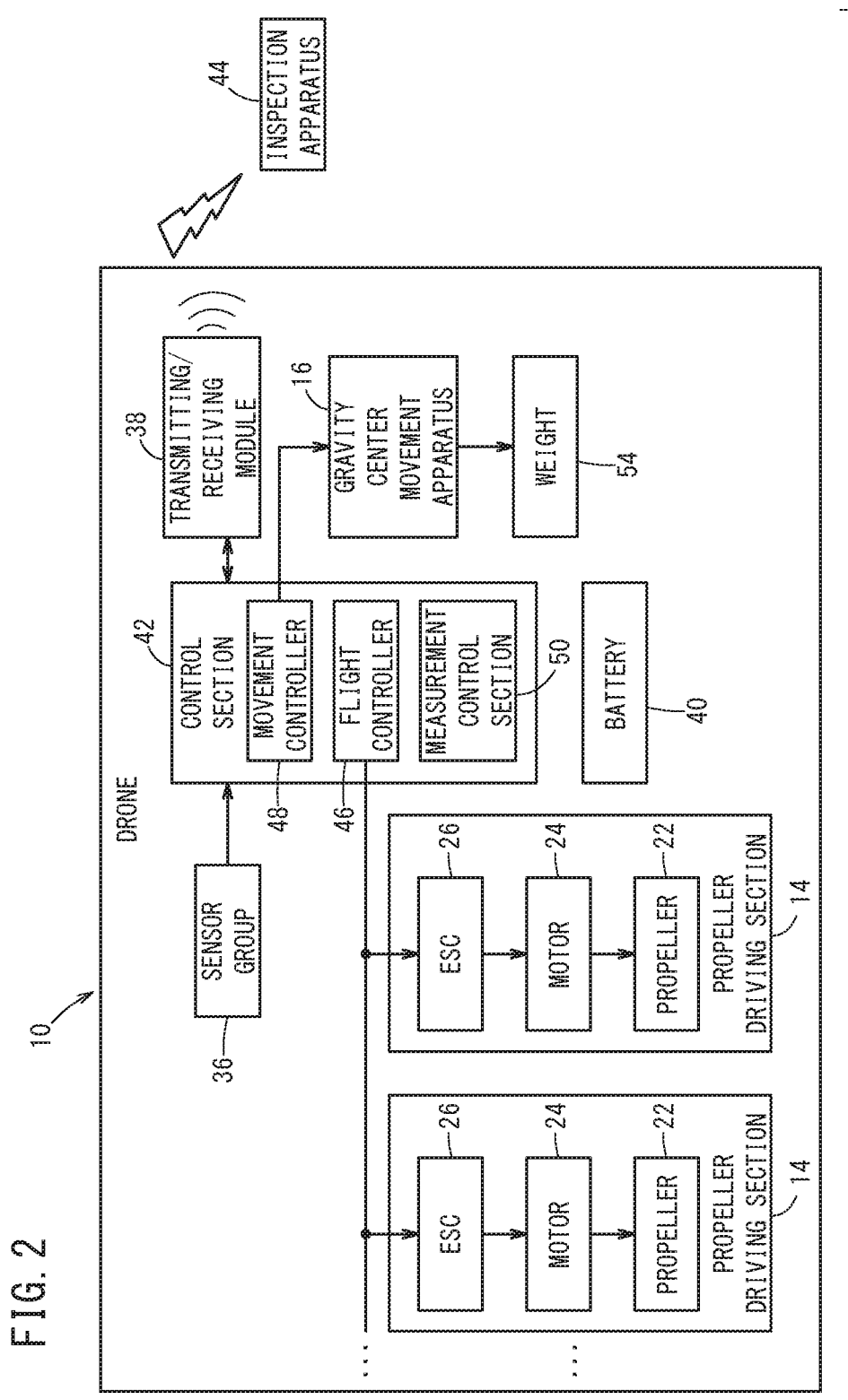
FIG. 2 is a block diagram showing each configuration of the flying body.

As shown in FIG. 2, the ESC 26 is connected, in a manner enabling signal transfer, to a control section 42 (flight controller 46) of the drone 10 provided within the main body 18. The ESC 26 controls the power supplied to the motor 24 (e.g. generates a pulse with a suitable time width from a DC voltage in the case of a brushed DC motor), based on a velocity command from the flight controller 46, to rotationally drive the motor 24.

Here, the top and bottom propeller driving sections 14 fixed to the pair of top and bottom extension frames 20 extending in the same direction are controlled to rotate in opposite directions from each other by the flight controller 46 when the drone 10 is flying stably. For example, if the top-side propeller 22 is made to rotate clockwise, the bottom-side propeller 22 is made to rotate counter-clockwise.

Returning to FIG. 1, the top and bottom extension frames 20 extending in the same direction hold, in a fixed manner, a protective frame 28 that protrudes farther from an installation location of the propeller driving section 14. The four protective frames 28 protrude farther outward than the propellers 22, and are provided with, at the protruding ends thereof, bars 30 that each have a prescribed length (a dimension longer than the thickness of the main body 18) in an up-down direction. Wires 32 are stretched between respective top positions of the four bars 30 and between respective bottom positions of the four bars 30 in a manner to go around the bars 30. In other words, the four bars 30 and the wires 32 form an outermost contour that is a boundary between the drone 10 and the outside, and prevent the propellers 22 and the main body 18 from colliding with the surrounding walls while the drone 10 is flying.

On the other hand, the main body 18 includes a box-shaped housing 34 to which the extension frames 20 are fixed. As shown in FIG. 2, apparatuses of an electrical system or the like that cause the propeller driving sections 14 and the gravity center movement apparatus 16 to operate are provided inside the housing 34. Specifically, the main body 18 includes a sensor group 36 that detects the flight status of the drone 10, a transmitting/receiving module 38 that performs information communication with the outside, a battery 40 for supplying power, and the control section 42 that controls the operation of the propeller driving sections 14 and the gravity center movement apparatus 16.

The sensor group 36 includes a plurality of types of detectors that detect the flight status of the drone 10 and output this detection information to the control section 42. Examples of the detectors of the sensor group 36 include a gyro sensor (angular acceleration sensor or angular velocity sensor), a GPS apparatus, an acceleration sensor, a velocity sensor, a distance sensor, an altitude sensor, a camera, and the like. In other words, the detection information output by the sensor group 36 includes the posture (angular acceleration or angular velocity), position information, acceleration, velocity, downward distance, altitude, and the like of the drone 10.

The transmitting/receiving module 38 forms a wireless communication line with the outside of the drone 10, and transmits and receives information to and from the outside. For example, the transmitting/receiving module 38 performs information communication with an inspection apparatus 44, and receives flight commands and gravity center movement commands for the drone 10 from the inspection apparatus 44. When, under the control of the control section 42, the total gravity center position TG is moved during flight and the flight status at this time is measured (detection information is acquired), the transmitting/receiving module 38 transmits information of the measurement results to the inspection apparatus 44.

The battery 40 is connected to the propeller driving sections 14 (ESCs 26), the gravity center movement apparatus 16, each detector of the sensor group 36, the transmitting/receiving module 38, and the control section 42, and suitably supplies the power needed for operation to these components.

The control section 42 is configured as a computer that includes a processor, a memory, and an input/output interface. The control section 42 includes the flight controller 46 that mainly controls the flight of the drone 10, and a movement controller 48 (movement control section) that mainly controls the gravity center movement apparatus 16. Furthermore, the control section 42 includes a measurement control section 50 that generates measurement results (i.e. measures the flight status of the drone 10) by extracting the detection information of the sensor group 36. The flight controller 46, the movement controller 48, and the measurement control section 50 may be provided integrally on a control substrate within the housing 34, or may be provided separately.

The flight controller 46 controls the rotational driving of each of the plurality of (eight) propeller driving sections 14 independently to cause the drone 10 to fly, based on a flight command received from the outside. Furthermore, the flight controller 46 acquires the detection information of the sensor group 36 during the flight of the drone 10 and autonomously controls the flight status (posture and position) according to the detection information. The flight controller 46 may be configured to perform the flying automatically without being dependent on the flight command from the outside, by storing flight content in advance in a memory.

The movement controller 48 controls the operation of the gravity center movement apparatus 16, based on a gravity center movement command received from the outside. The movement controller 48 may also be configured to perform the gravity center movement automatically without being dependent on the gravity center movement command from the outside, by storing gravity center movement content in advance in a memory.

Returning to FIG. 1, the gravity center movement apparatus 16 is installed on the top surface of the main body 18 of the drone 10. In the present embodiment, the gravity center movement apparatus 16 is formed by a slide mechanism 52 (linear stage) that is fixed to the top surface of the main body 18, and the weight 54 that is displaced by the slide mechanism 52.

The gravity center movement apparatus 16 moves a slider along directions in a two-dimensional plane (planar directions parallel to the rotational surfaces 22a of the propellers 22 provided on the top-side extension frames 20) at a prescribed height position above the main body 18, to displace the total gravity center position TG of the drone 10. The installment position of the gravity center movement apparatus 16 is not particularly limited, and the gravity center movement apparatus 16 may be attached to the bottom surface of the main body 18, for example.

More specifically, the slide mechanism 52 includes a pair of (two) fixed rails 56 that are fixed to the main body 18, and one movable rail 58 that can move on the pair of fixed rails 56. In a planar view facing the rotational surfaces 22a of the propellers 22, the pair of fixed rails 56 is fixed along the direction of both sides (transverse direction) of the drone 10, whereas the one movable rail 58 extends in the front-rear direction (longitudinal direction) of the main body 18. In other words, the movable rail 58 is provided in a direction orthogonal to the fixed rails 56.

The fixed rails 56 in the pair extend parallel to each other at positions a prescribed distance away from each other, and are each formed to reach a region near the outermost contour (wires 32) of the drone 10 in the transverse direction. Each (or one) fixed rail 56 in the pair is provided with a first ball screw mechanism 60. The first ball screw mechanism 60 includes a drive motor 60a, a lead screw 60b that rotates in accordance with rotation of the drive motor 60a, and a table (not shown in the drawings) that supports the bottom portion of the movable rail 58 and moves linearly due to the rotation of the lead screw 60*b*. The drive motors 60*a* of the first ball screw mechanisms 60 move the movable rail 58 linearly in the transverse direction to be arranged at a desired position, by being rotationally driven simultaneously and at the same velocity under the control of the movement controller 48 provided inside the main body 18.

On the other hand, the movable rail 58 is arranged slightly above the propellers 22, and extends to a region near the outermost contour (wires 32) of the drone 10 in the longitudinal direction. In the same manner as the fixed rails 56, the movable rail 58 is provided with a second ball screw mechanism 62 that is formed by a drive motor 62*a*, a lead screw 62*b*, and a table 62*c*. The table 62*c* of the second ball screw mechanism 62 supports the weight 54 described above in a fixed manner. The drive motor 62*a* of the second ball screw mechanism 62 moves the weight 54 linearly in the longitudinal direction to be arranged at a desired position, by being rotationally driven under the control of the movement controller 48 provided inside the main body 18.

The weight 54 should be designed to have a suitable weight and size that make it possible to easily change the total gravity center position TG of the drone 10. Under the driving of the slide mechanism 52, the weight 54 moves in the directions of a two-dimensional plane at a prescribed height position above the machine body 12. The slide mechanism 52 that moves the weight 54 is not limited to the first and second ball screw mechanisms 60 and 62 described above, and various types of mechanisms can be adopted. For example, the slide mechanism 52 may use a linear motor, an air cylinder, a hydraulic cylinder, or the like.

The drone 10 controls the gravity center movement apparatus 16 to, in an initial state (during an initial period of flight startup or during stable flight), set a reference position such that the total gravity center position TG is located at a center position OD of the rectangular drone 10. For the gravity center movement, the movement controller 48 causes the gravity center movement apparatus 16 to operate (to move the weight 54 with the first and second ball screw mechanisms 60 and 62) such that the total gravity center position TG moves from the initial position to a target position included in the gravity center movement command, for example. At this time, the gravity center movement apparatus 16 specifies the movement limit of the total gravity center position TG, and the control section 42 (movement controller 48) has a function to precisely adjust the movement velocity of the total gravity center position TG.

Next, the movement range and velocity control of the total gravity center position TG of the drone 10 will be described in detail with reference to FIG. 3. A movement limit $M_{lim}$ of the total gravity center position TG is specified by the installation state of the gravity center movement apparatus 16 and the control of the movement controller 48. The inside of the movement limit $M_{lim}$ becomes a movement range 64 of the total gravity center position TG. This movement range 64 of the total gravity center position TG is set to be within a range of the outermost contour of the drone 10, in a planar view facing the rotational surfaces 22*a* of the propellers 22.

In other words, with the drone 10 according to the present embodiment, in the planar view, lines that almost overlap with the wires 32 going around in a rectangular shape are the movement limit $M_{lim}$, and the inside of this movement limit $M_{lim}$ is the movement range 64 of the total gravity center position TG. The outermost contour of the drone 10 can be specified by a frame provided to the sides of the machine body 12 if the wires 32 are not provided, and can be lines connecting the circumscribed circles of the rotational surfaces 22*a* of the propellers 22 if the propellers 22 protrude to the sides in the planar view.

Furthermore, the movement controller 48 sets virtual frame lines 66 (virtual lines) serving as boundaries for changing the velocity. There can be one or more virtual frame lines 66, and first virtual lines 66*a* and second virtual lines 66*b* are set in the present embodiment. The first virtual lines 66*a* are lines connecting centers PO of the rotational surfaces 22*a* of the plurality of propellers 22 (i.e. the shaft portions of the motors 24) that are at the same distance from the center position OD of the drone 10 in the planar view. If there are propellers 22 that are at different distances from the center position OD, the drone 10 sets the first virtual lines 66*a* to be lines connecting the centers PO of the plurality of propellers 22 that are closest to the center position OD.

Yet further, the second virtual lines 66*b* are set to be lines connecting closest proximity points PN on the rotational surfaces 22*a* of the plurality of propellers 22 that are at the same distance from the center position OD of the drone 10 in the planar view. The proximity point PN can be said to be a point that is located on the rotational surface 22*a* of the propeller 22 and is at the shortest distance from the center position OD. If there are propellers 22 that are at different distances from the center position OD, the drone 10 sets the second virtual lines 66*b* to be lines connecting the proximity points PN of the plurality of propellers 22 that are closest to the center position OD.

Three regions (first to third regions 67, 68, and 69) are set in order from the outside to the inside within the movement range 64 of the total gravity center position TG, by the movement limit $M_{lim}$ and the first and second virtual lines 66*a* and 66*b*. In other words, in the planar view, the first region 67 is between the outside movement limit $M_{lim}$ and the first virtual lines 66*a*, the second region 68 is between the first virtual lines 66*a* and the second virtual lines 66*b*, and the third region 69 is inside the second virtual lines 66*b*.

The movement controller 48 moves the total gravity center position TG while adjusting the movement velocity of the total gravity center position TG in the first to third regions 67, 68, and 69. Specifically, in a case where the movement velocity in the first region 67 is a first velocity V1, the movement velocity in the second region 68 is a second velocity V2, and the movement velocity in the third region 69 is a third velocity V3, the operation of the gravity center movement apparatus 16 is controlled to establish a relationship of V1<V2<V3. In this way, the total gravity center position TG has a high movement velocity in the third region 69 that is close to the center position OD, and has low movement velocity in the first region 67 that is far from the center position OD.

As an example, the second velocity V2 should be set to be greater than or equal to 1.5 times the first velocity V1, and the third velocity V3 should be set to be greater than or equal to 1.5 times the second velocity V2. The first to third velocities V1 to V3 may have relative velocity ratios that are set in advance, and these velocities may be suitably distributed based on information concerning the velocity included in the gravity center movement command.

Figure 4:
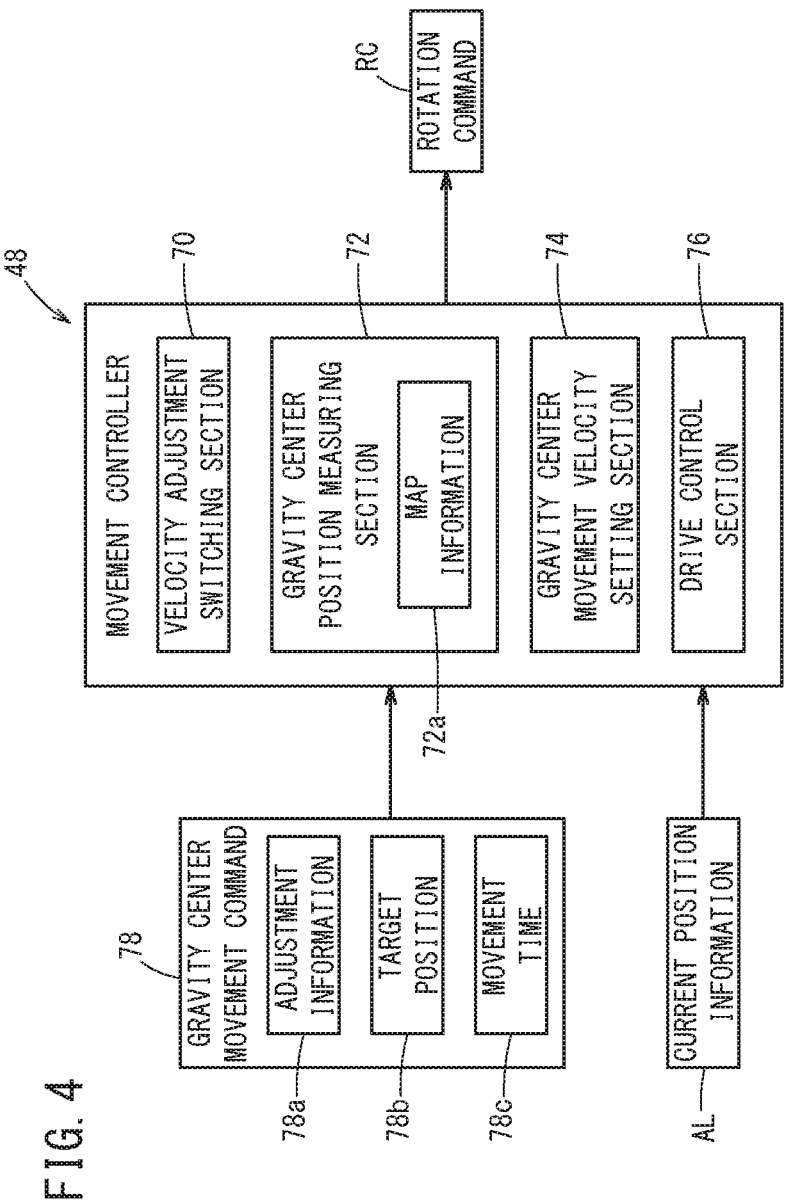
FIG. 4 is a block diagram showing a function of a movement controller.

In order to realize the movement of the total gravity center position TG described above, the movement controller 48 forms the function blocks shown in FIG. 4 therein by reading and executing a program (not shown in the drawings) stored in a memory. Specifically, a velocity adjustment switching section 70, a gravity center position measuring section 72, a gravity center movement velocity setting section 74, and a drive control section 76 are formed inside the movement controller 48.

The velocity adjustment switching section 70 switches whether to perform control to adjust the movement velocity during movement of the total gravity center position TG. For example, a gravity center movement command 78 includes adjustment information 78a indicating whether to adjust the movement velocity set by the user (inspector), and the velocity adjustment switching section 70 switches whether or not the movement velocity adjustment is implemented based on this adjustment information 78a. The drone 10 may be configured to include a physical switch (not shown in the drawings) for switching the gravity center movement velocity adjustment, and switch whether or not the movement velocity adjustment is implemented based on whether this physical switch is ON or OFF before flight.

The gravity center position measuring section 72 measures the total gravity center position TG of the drone 10 when the gravity center movement is implemented. For example, the gravity center position measuring section 72 acquires the feedback signal of an encoder (not shown in the drawings) of the gravity center movement apparatus 16 (first and second ball screw mechanisms 60 and 62), and acquires information (current position information AL) concerning the current position of the table 62c (weight 54). The gravity center position measuring section 72 then calculates the total gravity center position TG based on the current position information AL of the weight 54. As an example, the gravity center position measuring section 72 possesses map information 72a corresponding to the current position information AL of the weight 54, and extracts the total gravity center position TG from the current position information AL and the map information 72a. Furthermore, the gravity center position measuring section 72 may calculate the posture of the drone 10 and calculate or correct the total gravity center position TG, using the detection information such as the angular acceleration of the gyro sensor.

If the total gravity center position TG is not located at the center position OD of the drone 10 in the initial state before the gravity center movement is implemented, the movement controller 48 may arrange the total gravity center position TG at the center position OD (reference position) by causing the gravity center movement apparatus 16 to operate. In this way, the behavior of the drone 10 when the total gravity center position TG is displaced from the center position OD can be favorably measured.

The gravity center movement velocity setting section 74 sets the movement velocity of the total gravity center position TG in the first to third regions 67, 68, and 69, based on the first and second virtual lines 66a and 66b described above that are set in advance. For example, in a case where a target position 78b of the total gravity center position TG is included in the gravity center movement command 78, the gravity center movement velocity setting section 74 calculates a movement route (movement amount and movement direction) from the current position (current position information AL) and sets the first to third velocities V1 to V3 in the first to third regions 67, 68, and 69 through which this movement route passes.

As another example, if a total movement time 78c is included in the gravity center movement command 78 in addition to the target position 78b of the total gravity center position TG, the gravity center movement velocity setting section 74 calculates the movement route from the current position and sets the first to third velocities V1 to V3 in the first to third regions 67, 68, and 69 further based on the movement time 78c. Alternatively, the gravity center movement velocity setting section 74 may be configured to set the first to third velocities V1 to V3 in the first to third regions 67, 68, and 69 as upper limit values for the velocity and limit the movement velocity in each region such that the commanded movement velocity does not exceed the upper limit value.

The drive control section 76 generates drive content of the gravity center movement apparatus 16 based on the movement route and the movement velocity set by the gravity center movement velocity setting section 74, and controls the driving of the slide mechanism 52 based on this drive content. For example, the drive content is obtained by calculating a target control position of the table 62c of the slide mechanism 52 at every prescribed time, and the drive control section 76 should calculate the rotational velocity of the drive motor 60a and 62a of the first and second ball screw mechanisms 60 and 62, in accordance with this target control position, and output a rotation command RC.

The drone 10 according to the present embodiment is basically configured in the manner described above, and the following describes an example of a process flow for performing the gravity center movement during flight of the drone 10, while referencing the flow chart of FIG. 5.

When in use (when the flight status is being inspected), the drone 10 receives a flight command from the inspection apparatus 44 so that flight control is performed in accordance with the flight command using the flight controller 46 of the control section 42. The flight controller 46 causes the drone 10 to fly in an arbitrary direction with an arbitrary velocity or causes the drone 10 to stand by (hover) at an arbitrary position in a three-dimensional space, by controlling the rotational velocity and rotational direction of each of the plurality of propeller driving sections 14.

Upon receiving the gravity center movement command 78 from the inspection apparatus 44, the drone 10 implements the gravity center movement process flow using the movement controller 48. In the gravity center movement process flow, first, the velocity adjustment switching section 70 of the movement controller 48 sets whether or not the movement velocity adjustment is to be implemented, based on the adjustment information 78a included in the gravity center movement command 78 (step S1).

Next, the gravity center position measuring section 72 measures the current total gravity center position TG of the drone 10 (step S2). The movement controller 48 may be configured to constantly monitor the current position information AL of the total gravity center position TG, and quickly recognize the total gravity center position TG even when the activation is stopped or the like.

After this, the movement controller 48 judges whether to perform the adjustment of the movement velocity of the total gravity center position TG (step S3), proceeds to step S4 if the movement velocity is to be adjusted, and skips step S4 if the movement velocity is not to be adjusted.

At step S4, the gravity center movement velocity setting section 74 calculates and sets the movement route and the movement velocity of the total gravity center position TG, based on the target position 78b included in the gravity center movement command 78, the current position information AL of the total gravity center position TG, and the first to third velocities V1 to V3 in the first to third regions 67, 68, and 69. In this way, a suitable movement velocity is set according to the regions through which the total gravity center position TG is to pass.

The drive control section 76 then generates the drive content of the gravity center movement apparatus 16 based on the movement route (or the set movement velocity if the movement velocity is to be adjusted) of the total gravity center position TG, and controls the driving of the slide mechanism 52 (step S5). In this way, the gravity center movement apparatus 16 moves the total gravity center position TG to the target position 78b by displacing the weight 54.

Finally, the movement controller 48 judges whether the gravity center movement included in the gravity center movement command 78 has been finished (step S6). For example, if the implementation of the next gravity center movement is recorded in the gravity center movement command 78 or if the next gravity center movement command 78 is received, the process returns to step S1 and the same process is repeated. Furthermore, if there is no subsequent gravity center movement planned, the gravity center movement process flow is finished. Then, if another gravity center movement command 78 is received after some time has passed, the process is started again from step S1.

Furthermore, the measurement control section 50 of the drone 10 works together with the movement controller 48 to generate measurement results by acquiring and storing the detection information from the sensor group 36 before, during, and after the movement of the total gravity center position TG. The control section 42 then transmits the acquired measurement results to the inspection apparatus 44 at a suitable timing. In this way, the inspection apparatus 44 can acquire the measurement results and suitably process these measurement results.

The drone 10 according to the first embodiment realizes the effects described below, due to the configuration described above.

The drone 10 can allow a user to check the change in posture of the drone 10 that accompanies the gravity center movement of the gravity center movement apparatus 16, with a simple configuration that includes the gravity center movement apparatus 16 and the movement controller 48. Specifically, during flight of the drone 10, the movement controller 48 checks where the gravity center of the overall drone 10 is and moves the total gravity center position TG to the target position 78b by controlling the operation of the gravity center movement apparatus 16. In this way, it is possible to easily reproduce the change in the gravity center occurring when a disturbance is received in a realistic flight environment. Accordingly, the drone 10 can favorably implement various types of flight testing.

Furthermore, in a case where the gravity center movement apparatus 16 is provided in the top portion of the machine body 12, it is possible to reproduce a boarding type of drone onto which a person can board, as the drone 10 planned for development. In other words, even though a person does not actually board the drone 10, it is possible to simulate a flight state of the drone 10 equivalent to a state in which a person has boarded (posture change caused by weight movement or the like). Alternatively, if the gravity center movement apparatus 16 is provided in the bottom portion of the machine body 12, it is possible to reproduce a loading type of drone onto which heavy objects (baggage) are loaded, as the drone 10 planned for development. In other words, even though heavy objects are not actually loaded onto the drone 10, it is possible to simulate a flight state of the drone 10 equivalent to a state in which heavy objects have been loaded (gravity center position change caused by baggage movement or the like).

Furthermore, the posture of the drone 10 can be stabilized during flight, by having the drone 10 arrange the total gravity center position TG at the center position OD of the drone 10. Then, by moving the total gravity center position TG from this center position OD, it is possible to easily and accurately reproduce the gravity center movement occurring when a disturbance is received while the posture is stable.

The drone 10 enables the flight status to be tested in a case where the total gravity center position TG has moved in a wide range, by setting the movement range 64 of the total gravity center position TG to be within the outermost contour of the drone 10.

Yet further, the drone 10 uses the gravity center movement velocity setting section 74 to adjust the gravity center movement operation such that the movement velocity of the total gravity center position TG becomes lower in a stepped manner from the inside toward the outside, and therefore it is possible to stabilize the flight posture even during movement of the total gravity center position TG. In this way, it is possible to implement the flight testing with a high degree of safety.

In addition, the drone 10 can switch whether or not the adjustment of the movement velocity of the total gravity center position TG is performed. In this way, it is possible to favorably switch between flight testing in a case where the total gravity center position TG is moved while considering the flight posture or the like, and flight testing in a case where the total gravity center position TG is moved rapidly or the like, for example.

Furthermore, since the gravity center movement apparatus 16 is the slide mechanism 52, when the gravity center movement is implemented, the drone 10 can move the total gravity center position TG by smoothly displacing the weight 54 in directions along the rails. Yet further, the slide mechanism 52 can position the weight 54 inside the wires 32, and can suppress the gravity center movement apparatus 16 from experiencing direct impact during a collision of the drone 10 or the like.

The present invention is not limited to the embodiment described above, and various alterations can be made within the scope of the invention. For example, the adjustment of the movement velocity of the total gravity center position TG is not limited to setting the first to third regions 67, 68, and 69 and causing the movement velocity to be lower in outer regions than in inner regions in a stepped manner. As an example, the movement velocity of the total gravity center position TG may be set to be higher in outer regions than in inner regions.

The drone 10 does not need to determine regions in which the movement velocity is changed. For example, the movement velocity of the total gravity center position TG can be set to decrease as the total gravity center position TG becomes farther from the center position OD of the drone 10. In other words, the movement controller 48 changes the movement velocity linearly according to the position of the total gravity center position TG. In this case as well, it is possible to easily maintain the flight posture when the total gravity center position TG is moved to a position away from the center position OD. Accordingly, even safer flight testing can be implemented.

As another example, the movement velocity of the total gravity center position TG can be set to increase as the total gravity center position TG becomes closer to the center position OD of the drone 10. In other words, the movement controller 48 changes the movement velocity linearly according to the position of the total gravity center position TG. In this case as well, it is possible to easily maintain the flight posture quickly when the total gravity center position TG is moved to a position near the center position OD. Accordingly, even safer flight testing can be implemented.

Furthermore, the gravity center movement apparatus 16 may implement various types of movement for the gravity center movement of the total gravity center position TG. For example, in addition to moving the total gravity center position TG in prescribed directions in a three-dimensional space from the center position OD of the drone 10, the gravity center movement apparatus 16 may operate to move the total gravity center position TG back and forth or vibrate the total gravity center position TG with a short period or to cause the total gravity center position TG to go around the main body 18.

Figure 6A:
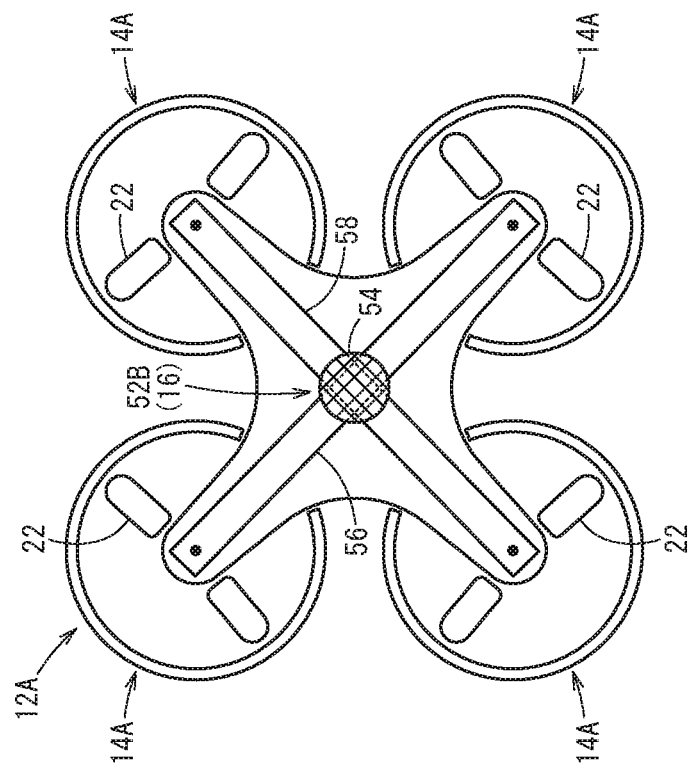
FIG. 6A is a schematic planar view showing a machine body and a slide mechanism according to a first modification.

As shown in a first modification shown in FIG. 6A, a machine body 12A of the drone 10 may include four propeller driving sections 14A and be formed with a square shape in the planar view. In this case as well, it is possible to favorably move the total gravity center position TG by installing the gravity center movement apparatus 16. In other words, the planar shape of the drone 10 in which the gravity center movement apparatus 16 is installed is not particularly limited, and this planar shape may be substantially circular or some other polygon, instead of the shapes described above. As shown in FIG. 6A, the gravity center movement apparatus 16 (slide mechanism 52A) may also be formed by a single fixed rail 56 and a single movable rail 58.

Figure 6B:
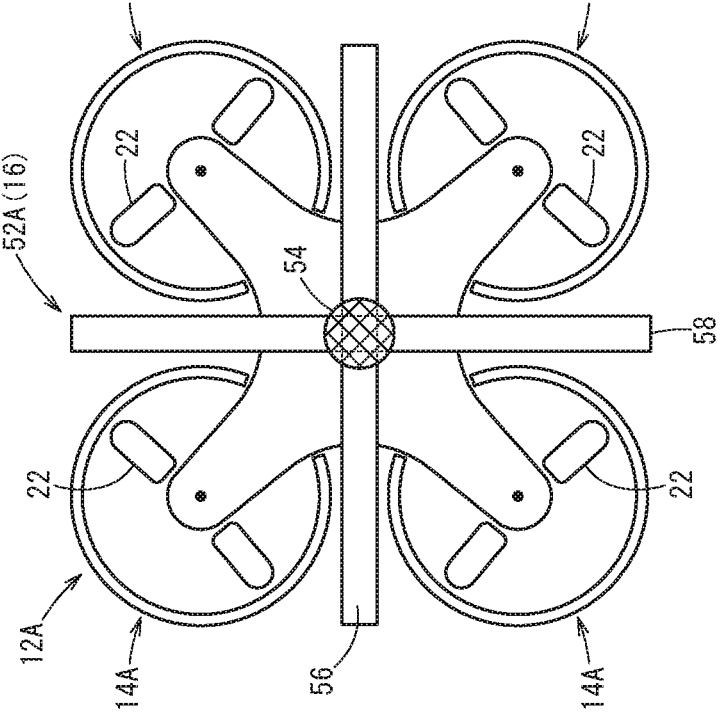
FIG. 6B is a schematic planar view showing a machine body and a slide mechanism according to a second modification.

As another example, as shown in a second modification shown in FIG. 6B, the gravity center movement apparatus 16 (slide mechanism 52B) may be configured to move the weight 54 along the diagonal lines of the outermost contour of the machine body 12A in the planar view. For the movement of the weight 54, the gravity center movement apparatus 16 preferably limits the movement such that the total gravity center position TG does not move beyond the outermost contour even when the movable rail 58 is displaced beyond the outermost contour, by specifying the movement limit $M_{lim}$ to be the outermost contour of the drone 10.

The movement range 64 (movement limit $M_{lim}$) of the total gravity center position TG in the planar view is not limited to being the outermost contour of the drone 10, and may be set to be farther inward than the outermost contour in the planar view. For example, with reference to FIG. 3, the movement controller 48 may set the movement range 64 of the total gravity center position TG to be within the virtual lines (first virtual lines 66a) connecting the centers PO of the rotational surfaces 22a of the plurality of propeller driving sections 14, in the planar view. By setting the movement range 64 of the total gravity center position TG in this way, it is possible to test the flight status in a case where the total gravity center position TG has moved within a certain range, while stabilizing the flight of the drone 10.

Figure 3:
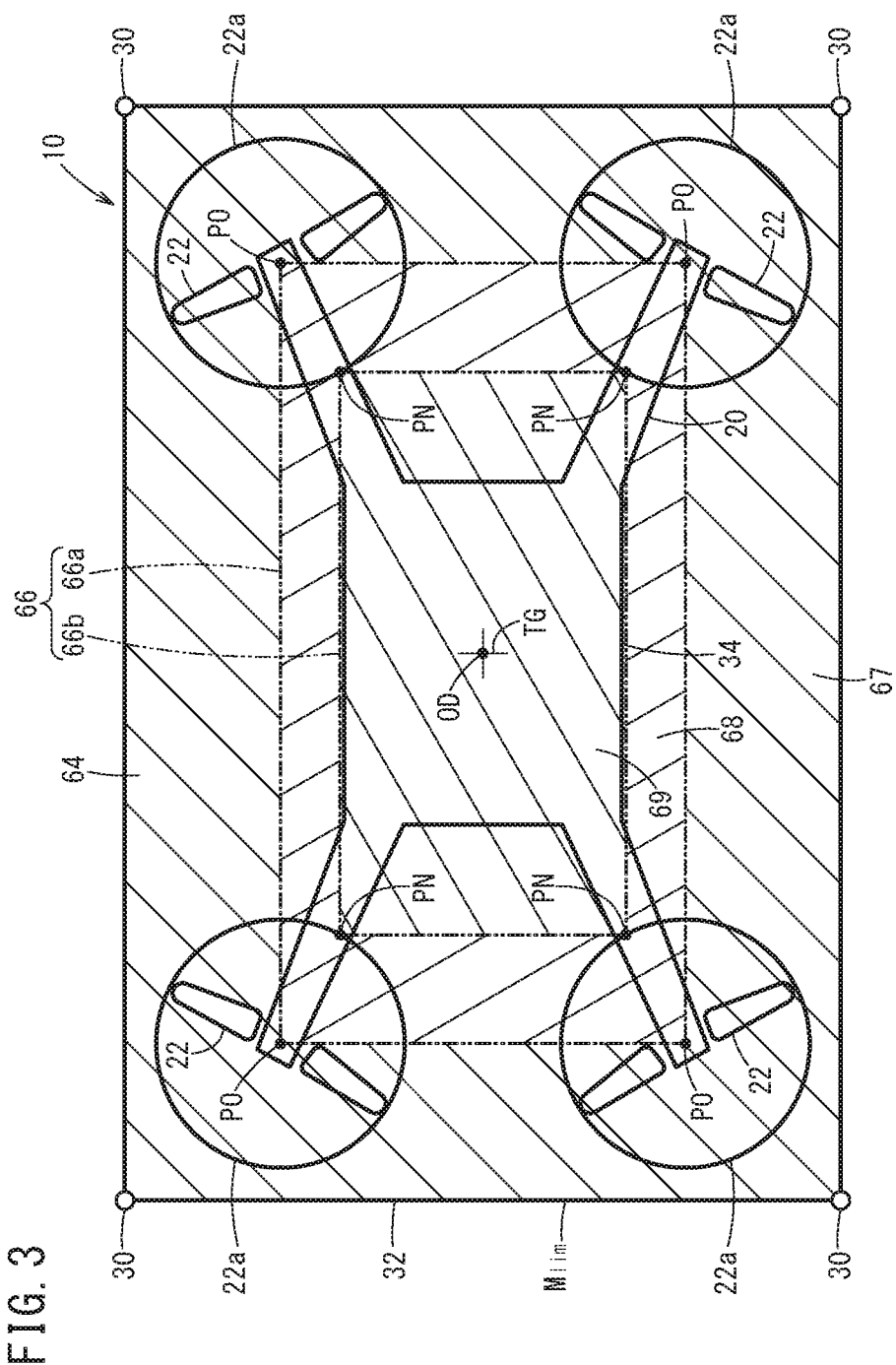
FIG. 3 is a schematic planar view showing a movement range and velocity control regions of a total gravity center position.

Alternatively, with reference to FIG. 3, the movement controller 48 may set the movement range 64 of the total gravity center position TG to be within the virtual lines (second virtual lines 66b) connecting the proximity points PN that are located in the plurality of propeller driving sections 14 and closest to the center position OD of the drone 10, in the planar view. In this way, it is possible to test the flight status in a case where the total gravity center position TG has moved within a narrow range, while stabilizing the flight of the drone 10.

Second Embodiment

Figure 7:
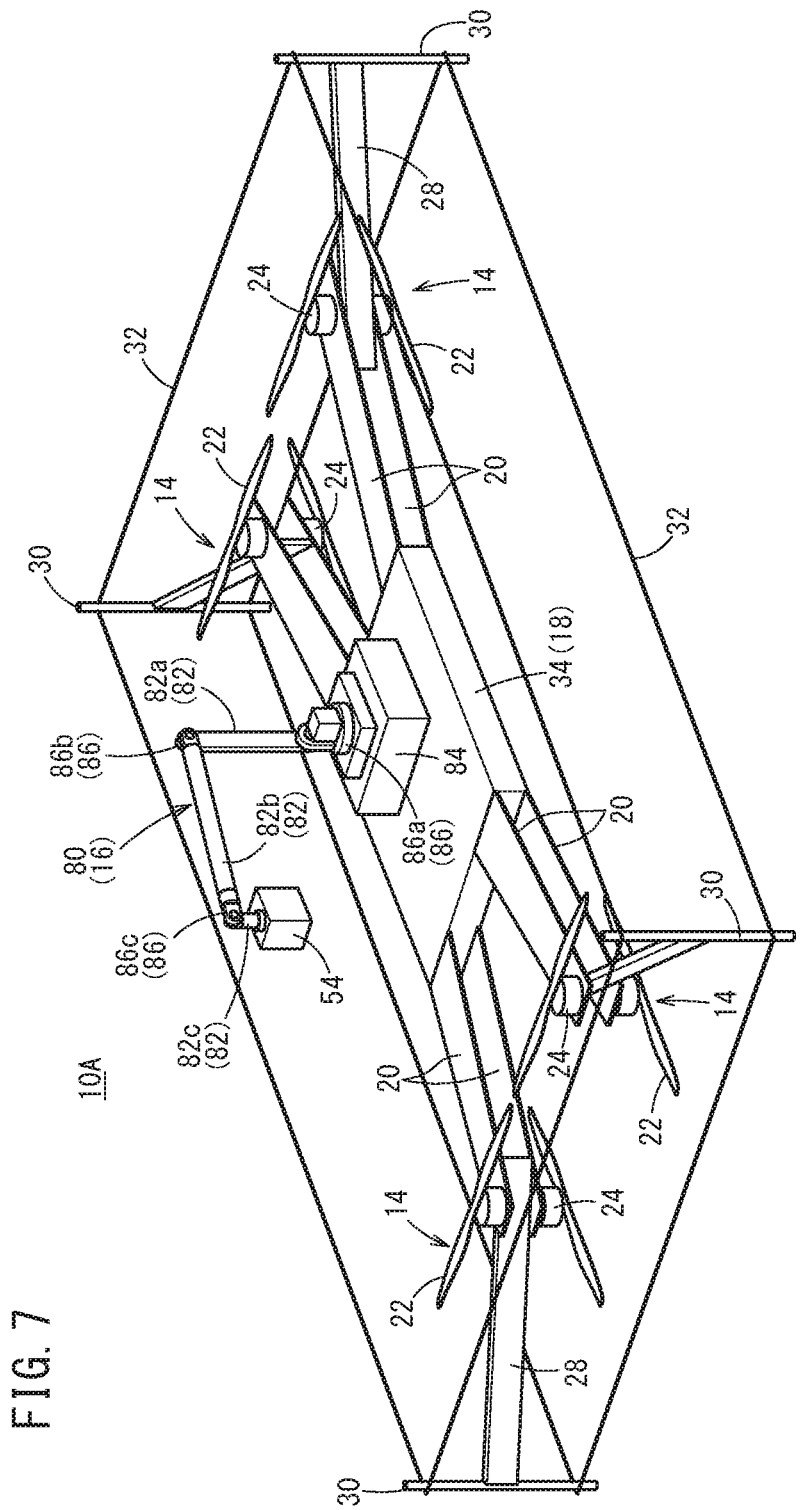
FIG. 7 is a perspective view showing an overall configuration of a flying body according to a second embodiment of the present invention.

As shown in FIG. 7, a drone 10A (flying body) according to the second embodiment differs from the drone 10 according to the first embodiment by including a robot arm 80 as the gravity center movement apparatus 16. The configuration other than the gravity center movement apparatus 16 is basically the same as the configuration of the drone 10 described above, and elements having the same configuration are given the same reference numerals while detailed descriptions thereof are omitted.

Specifically, the robot arm 80 includes a plurality of arms 82 (first to third arms 82a to 82c), a base platform 84 that supports the arms 82, and a plurality of joint portions 86 that rotatably connect the arms 82 to each other and to the base platform 84. The joint portions 86 include a first joint portion 86a that connects the base platform 84 and the first arm 82a, a second joint portion 86b that connects the first arm 82a and the second arm 82b, and a third joint portion 86c that connects the second arm 82b and the third arm 82c.

Among the plurality of arms 82, the third arm 82c is formed to be capable of moving farthest from the base platform 84, and to be a hand portion that holds the weight 54. In other words, in the second embodiment, the three-dimensional position of the weight 54 is displaced by the movement of the first to third arms 82a to 82c.

Among the plurality of joint portions 86, the first joint portion 86a is capable of rotating 360° in the planar direction of the base platform 84 and of moving the first arm 82a in a manner to trace a semicircle from the plane of the base platform 84, in a planar view facing the rotational surfaces 22a. Each of the first to third joint portions 86a to 86c is provided with a servo motor (not shown in the drawings), and the pivoting of each servo motor is controlled by the movement controller 48 provided within the base platform 84.

With the robot arm 80 configured as described above, the drone 10A can freely move the total gravity center position TG in the same manner as the gravity center movement apparatus 16 according to the first embodiment. In particular, the robot arm 80 can move the total gravity center position TG in a manner to travel along various movement routes in a three-dimensional space.

What is claim is:

1. A flying body that includes a lift generation apparatus in a machine body and is capable of flying through air due to driving of the lift generation apparatus, the flying body comprising:
    a gravity center movement apparatus that is provided in a top portion or a bottom portion of the machine body and is configured to move a total gravity center position of the overall flying body; and
    a movement control section configured to move the total gravity center position to a target position, by acquiring the total gravity center position and controlling operation of the gravity center movement apparatus,
    wherein the movement control section adjusts movement velocity of the total gravity center position in a manner that the movement velocity decreases as the total gravity center position becomes farther from a center position of the flying body.

2. The flying body according to claim 1, wherein
    the movement control section arranges the total gravity center position at a center position of the flying body in an initial state, by controlling the operation of the gravity center movement apparatus.

3. The flying body according to claim 1, wherein
    the movement control section sets a movement range of the total gravity center position to be within an outermost contour of the flying body, in a planar view.

4. The flying body according to claim 1, wherein
    the lift generation apparatus is provided in plurality to the machine body, and
    the movement control section sets a movement range of the total gravity center position to be within virtual lines connecting centers of the plurality of lift generation apparatuses, in a planar view.

5. The flying body according to claim 1, wherein the lift generation apparatus is provided in plurality to the machine body, and
the movement control section sets a movement range of the total gravity center position to be within virtual lines connecting proximity points that are located in the plurality of lift generation apparatuses and closest to a center position of the flying body, in a planar view.

6. The flying body according to claim 1, wherein the movement control section is configured to switch whether or not adjustment of the movement velocity is implemented.

7. The flying body according to claim 1, wherein the gravity center movement apparatus is a slide mechanism configured to move a weight along a rail provided to the machine body.

8. The flying body according to claim 1, wherein the gravity center movement apparatus is a robot arm that includes a plurality of arms provided to the machine body, and a joint portion configured to pivotably connect one arm to another arm, the robot arm being configured to move a weight fixed to the arms.

9. A flying body that includes a lift generation apparatus in a machine body and is capable of flying through air due to driving of the lift generation apparatus, the flying body comprising:
a gravity center movement apparatus that is provided in a top portion or a bottom portion of the machine body and is configured to move a total gravity center position of the overall flying body; and
a movement control section configured to move the total gravity center position to a target position, by acquiring the total gravity center position and controlling operation of the gravity center movement apparatus,
wherein the movement control section adjusts movement velocity of the total gravity center position in a manner to increase as the total gravity center position becomes closer to a center position of the flying body.

10. The flying body according to claim 9, wherein the movement control section arranges the total gravity center position at a center position of the flying body in an initial state, by controlling the operation of the gravity center movement apparatus.

11. The flying body according to claim 9, wherein the movement control section sets a movement range of the total gravity center position to be within an outermost contour of the flying body, in a planar view.

12. The flying body according to claim 9, wherein the lift generation apparatus is provided in plurality to the machine body, and
the movement control section sets a movement range of the total gravity center position to be within virtual lines connecting centers of the plurality of lift generation apparatuses, in a planar view.

13. The flying body according to claim 9, wherein the lift generation apparatus is provided in plurality to the machine body, and
the movement control section sets a movement range of the total gravity center position to be within virtual lines connecting proximity points that are located in the plurality of lift generation apparatuses and closest to a center position of the flying body, in a planar view.

14. The flying body according to claim 9, wherein the movement control section is configured to switch whether or not adjustment of the movement velocity is implemented.

15. The flying body according to claim 9, wherein the gravity center movement apparatus is a slide mechanism configured to move a weight along a rail provided to the machine body.

16. The flying body according to claim 9, wherein the gravity center movement apparatus is a robot arm that includes a plurality of arms provided to the machine body, and a joint portion configured to pivotably connect one arm to another arm, the robot arm being configured to move a weight fixed to the arms.

17. A flying body that includes a lift generation apparatus in a machine body and is capable of flying through air due to driving of the lift generation apparatus, the flying body comprising:
a gravity center movement apparatus that is provided in a top portion or a bottom portion of the machine body and is configured to move a total gravity center position of the overall flying body; and
a movement control section configured to move the total gravity center position to a target position, by acquiring the total gravity center position and controlling operation of the gravity center movement apparatus, wherein the lift generation apparatus is provided in plurality to the machine body, wherein the movement control section sets a movement limit of the total gravity center position to be an outermost contour of the flying body in a planar view, and sets first virtual lines connecting centers of the plurality of lift generating apparatuses, and second virtual lines connecting proximity points that are located in the plurality of lift generation apparatuses and closest to a center position of the flying body, in the planar view, and wherein in a case where movement velocity of the total gravity center position in a first region between the movement limit and the first virtual lines is a first velocity V1, the movement velocity of the total gravity center position in a second region between the first virtual lines and the second virtual lines is a second velocity V2, and the movement velocity of the total gravity center position in a third region inside the second virtual lines is a third velocity V3, the movement control section adjusts the movement velocity such that $V1<V2<V3$ is established.

18. The flying body according to claim 17, wherein the movement control section arranges the total gravity center position at a center position of the flying body in an initial state, by controlling the operation of the gravity center movement apparatus.

19. The flying body according to claim 17, wherein the movement control section sets a movement range of the total gravity center position to be within an outermost contour of the flying body, in a planar view.

20. The flying body according to claim 17, wherein the lift generation apparatus is provided in plurality to the machine body, and
the movement control section sets a movement range of the total gravity center position to be within virtual lines connecting centers of the plurality of lift generation apparatuses, in a planar view.

* * * * *